Patented Nov. 8, 1932

1,886,580

UNITED STATES PATENT OFFICE

JAMES B. PIERCE, JR., OF CHARLESTON, WEST VIRGINIA, ASSIGNOR TO BARIUM RE-DUCTION CORPORATION, OF CHARLESTON, WEST VIRGINIA, A CORPORATION OF DELAWARE

PROCESS OF DEHYDRATING GLAUBER SALT

No Drawing. Original application filed December 8, 1928, Serial No. 324,810. Divided and this application filed September 15, 1931. Serial No. 562,995.

This invention relates to the dehydration of hydrated sodium sulphate commonly known as Glauber salt and has for its particular objects the expeditious and economical production of dehydrated sodium sulphate by a simple and direct procedure which involves a minimum of expense for equipment.

Glauber salt, as is well known, contains approximately 56% by weight of water crystallization, which salt because of the unusual high percentage of said content therein, melts or dissolves in its own water of crystallization at 32°C., which characteristic has seriously interfered with the economical removal of said water of crystallization by a simple heating operation, either of the open air or vacuum pan type, as concentrated sodium sulphate liquor "sets up" or plasters hard on the surfaces of the evaporators not only thereby yielding an unsatisfactory product from a physical standpoint but resulting in excessive cost of operation because of the necessity for preventing the clogging of the system and also for preventing the entrapped brine from causing a "setting up" of dehydrated crystals in the salt baskets themselves. Furthermore, the equipment necessary in such operation was expensive and difficult to maintain in continuous operation without entailing excessive cost.

Many of the more important processes both mechanical and chemical which have been heretofore proposed for accomplishing the dehydration of Glauber salt are discussed in a bulletin of the Canadian Department of Mines published at Ottawa, Canada, Number 646, pages 47 to 54 thereof, in an article entitled "Sodium sulphate of western Canada" and the various reasons for the unsatisfactory operation of such processes or the excessive cost thereof are summarized therein.

Because of the unsatisfactory nature of the various processes heretofore proposed for the dehydration of Glauber salt or the evaporation of the highly concentrated naturally occurring brine both from the standpoint of economy of operation, as well as from economy of equipment, it has been impossible to develop many natural occurring deposits of Glauber salt and brine which otherwise would have afforded an excellent source of such material.

My investigations have led to the discovery of an exceedingly simple and practical process for the dehydration of Glauber salt and which because of its economy, both as regards operation and equipment costs, is easily adapted for use in the development of such natural occurring deposits of Glauber salt and brine, the same being fully set forth in the following detailed description thereof.

When operating upon a concentrated sodium sulphate brine, approximately corresponding in composition to $Na_2SO_4.10H_2O$ (i. e. having a 44% of $Na_2SO_4$ content) or even brine solution of greater concentration due to super saturation, the saturated brine solution is mixed with sufficient anhydrous sodium sulphate, approximately twice the amount by weight of the brine solution treated, to convert the mass into the condition corresponding to damp sand i. e. in a condition so that the mass is a solid phase as distinguished from a brine or liquor, but still noticeably damp.

The mixing operation is preferably performed in a suitable mixing apparatus such for example as is commonly employed in similar operations in industrial chemical plants. This sand-like mass is then continuously introduced into a direct heated rotary drier which is heated to between approximately 110° C. and 800° C. and preferably at a temperature of about 600° C., the resultant dried anhydrous sodium sulphate being continuously removed from the far end of the drier.

The aforesaid process serves to prevent the formation of a liquid when the Glauber salt, which preferably, as above stated, comprises one-third of the entire mass, liquefies upon the temperature exceeding 32° C., and operates to prevent the "setting up" and sticking of the dehydrated mass to the surfaces of the drier as the mass tends to remain in a porous, friable condition and of the texture which is desired by commercial users of anhydrous sodium sulphate. Moreover, it is possible to employ temperatures close to the fusing point of the anhydrous sodium sulphate (approximately 880° C.), which high temperatures are highly desirable and, as above stated, a temperature of about 600° C. is particularly suited for the successful operation of this process.

While I preferably employ a direct fired rotary drier of the well known type, I may employ with equally satisfactory results other types of driers, such as a covered rotating table either directly fired from above or indirectly fired from below, the mass to be dried being continuously fed thereto and the dried salt being continuously removed therefrom by a scraper.

If a rotary drier of the ordinary brickline type is employed and the same is directly fired with an ashless fuel, it is possible, without further purification to obtain a product of sufficient purity for many commercial purposes, particularly for use in the glass making industry as a substitute for the present so-called glass maker's salt cake.

By virtue of the high tempertures which it is possible to employ in my improved process, the same is far more efficient and economical both as to original capital cost as well as regards fuel and operating cost than any of the prior low temperature drying or evaporating processes heretofore known.

This application is a division of my copending application No. 324,810 filed Dec. 8, 1928, for improvements in process of dehydrating Glauber salt, in which application the specific claim was drawn to a different species, namely the processing of Glauber salt while in a solid phase throughout.

Having thus described my invention, what I claim and desire to obtain by United States Letters Patent is:—

1. The method of dehydrating Glauber salt, which consists in mixing with sodium sulphate dekahydrate while in a liquid phase, a sufficient quantity of dehydrated sodium sulphate to convert the mass into a substantially solid phase condition corresponding substantially to damp sand, whereby the liquefaction of the mass when heated above 32° C. is substantially prevented and then continuously feeding said mixture into a furnace heated to a temperature approximately 600° C. while continuously removing the dehydrated salt so obtained from said furnace.

2. The method of dehydrating Glauber salt, which consists in mixing with a saturated Glauber salt brine, substantially corresponding in composition to $Na_2SO_4.10H_2O$. a sufficient quantity of dehydrated sodium sulphate to convert the mass to a substantially solid phase corresponding to the condition of damp sand in order to prevent the liquefaction or caking of the mass when heated above 32° C. and then heating said mass at an elevated temperature until the same is dry and substantially anhydrous.

3. The method of dehydrating Glauber salt, which consists in mixing with a saturated Glauber salt brine, substantially corresponding in composition to $Na_2SO_4.10H_2O$, a sufficient quantity, approximately twice its weight, of dehydrated sodium sulphate to convert the mass to a substantially solid phase corresponding to the condition of damp sand in order to prevent the liquefaction or caking of the mass when heated above 32° C. and then heating said mass at an elevated temperature until the same is dry and substantially anhydrous.

Signed at Charleston, in the county of Kanawha, in the State of West Virginia, this 11th day of September, 1931.

JAMES B. PIERCE, Jr.